United States Patent
Sato (10) Patent No.: US 7,277,676 B2
(45) Date of Patent: Oct. 2, 2007

(54) PORTABLE TELEPHONE DEVICE AND EXTERNAL ADAPTER CONNECTED BY A SHORT-RANGE WIRELESS LINK

(75) Inventor: Ryohei Sato, Saitama (JP)

(73) Assignee: NEC Corporation (JP)

( * ) Notice: Subject to any disclaimer, the term of this patent is extended or adjusted under 35 U.S.C. 154(b) by 577 days.

(21) Appl. No.: 10/817,977

(22) Filed: Apr. 5, 2004

(65) Prior Publication Data

US 2004/0198422 A1 Oct. 7, 2004

(30) Foreign Application Priority Data

Apr. 4, 2003 (JP) ............................. 2003-101814

(51) Int. Cl.
*H04B 7/00* (2006.01)

(52) U.S. Cl. ............... 455/41.2; 455/552.1; 455/575.2; 455/569.1

(58) Field of Classification Search ............... 455/41.2, 455/552.1, 73, 343.1, 569.1, 575.2, 41.1, 455/41.3, 5.2, 414.1, 550.1, 556.1; 348/14.02; 370/338

See application file for complete search history.

(56) References Cited

U.S. PATENT DOCUMENTS

| | | | |
|---|---|---|---|
| 5,809,414 A | | 9/1998 | Coverdale et al. |
| 5,991,645 A | * | 11/1999 | Yuen et al. .............. 455/575.2 |
| 2002/0068600 A1 | * | 6/2002 | Chihara et al. ............. 455/550 |
| 2002/0115478 A1 | * | 8/2002 | Fujisawa et al. ............ 455/567 |
| 2002/0132585 A1 | * | 9/2002 | Palermo et al. ............... 455/41 |
| 2003/0003907 A1 | * | 1/2003 | Lai et al. ..................... 455/425 |
| 2003/0045235 A1 | * | 3/2003 | Mooney et al. ............... 455/41 |
| 2004/0110474 A1 | * | 6/2004 | Yonekura et al. ............. 455/74 |
| 2004/0176065 A1 | * | 9/2004 | Liu ........................ 455/343.1 |
| 2004/0204168 A1 | * | 10/2004 | Laurila .................... 455/569.1 |
| 2006/0252457 A1 | * | 11/2006 | Schrager .................. 455/556.1 |

FOREIGN PATENT DOCUMENTS

| | | |
|---|---|---|
| EP | 1 251 472 A1 | 10/2002 |
| JP | 11-127484 | 5/1999 |
| JP | 11-220765 | 8/1999 |

(Continued)

OTHER PUBLICATIONS

Search Report issued by European Patent Office on Sep. 30, 2005 in connection with corresponding application No. EP 04 00 7981.6.

(Continued)

*Primary Examiner*—Matthew D. Anderson
*Assistant Examiner*—Tan Trinh
(74) *Attorney, Agent, or Firm*—Ostrolenk, Faber, Gerb & Soffen, LLP (57) ABSTRACT

A portable telephone device has a long-range wireless communication function and a short-range wireless communication function for communicating with an external adapter. The quality of short-range communication with the external adapter is monitored during the long-range communication. When the quality of short-range communication has been deteriorated, a message indicative of short-range communication deterioration is transmitted to the party on the other end of line. Voice data received from the party on the other end of line in response to the message is recorded onto a data memory.

12 Claims, 4 Drawing Sheets

FOREIGN PATENT DOCUMENTS

| | | |
|---|---|---|
| JP | 2001-258077 | 9/2001 |
| JP | 2001-345756 | 12/2001 |
| JP | 2002-33824 | 1/2002 |
| JP | 2002-176487 | 6/2002 |
| JP | 2002-271342 | 9/2002 |
| JP | 2002-305577 | 10/2002 |
| JP | 2003-69472 | 3/2003 |
| WO | WO 01/26401 A1 | 4/2001 |
| WO | WO 02/067472 A1 | 8/2002 |
| WO | WO 02/075938 A2 | 9/2002 |

OTHER PUBLICATIONS

Untranslated Office Action issued by Japanese Patent Office on Dec. 13, 2005 in connection with corresponding Japanese patent application No. 2003-101814.

English translation of relevant portions of Office Action issued by Japanese Patent Office in connection with corresponding Japanese patent application No. 2003-101814.

* cited by examiner

PORTABLE TELEPHONE DEVICE AND EXTERNAL ADAPTER CONNECTED BY A SHORT-RANGE WIRELESS LINK

BACKGROUND OF THE INVENTION

1. Field of the Invention

The present invention relates to a portable telephone terminal having an external adapter connected thereto through a short-range wireless link and in particular to communication control techniques for the portable telephone terminal and the external adapter.

2. Description of the Related Art

In recent years, a portable telephone device such as a cellular phone has become used not only as a telephone but also as a sophisticated information terminal having various additional functions, for example, browsing information on the Internet, e-mail transmission/reception and the like. However, voice communication is still of essential importance to such portable telephone devices.

To ensure ease in carrying, a portable telephone device becomes smaller in size. But smaller size makes a portable telephone device inconvenient to use because the distance between a microphone (transmitter) and a speaker (receiver) thereof is also made shorter.

One solution to such a problem is to employ a headset having an earphone and transmitter therein, which is connected to the portable telephone device by radio.

Japanese Patent Application Unexamined Publication No. 11-220765 discloses a combined mobile communication device. A mobile communication device is formed by combining a main unit with a radio transceiver, a voice input/output device having an earphone-microphone therein and other components, which are individual units connected to the main circuit unit by wireless interfaces.

Japanese Patent Application Unexamined Publication No. 2002-33824 discloses a portable communication device equipped with a radio transmitter for communication with a base station and a BlueTooth® transmitter for data communication directly with another portable communication device. In this conventional portable communication device, the remaining amount of battery is monitored and, when it drops below a predetermined threshold level, data transmission by the BlueTooth transmitter is terminated so as to avoid destroying important data to be transferred from a master to a slave.

However, in the case of a portable telephone device having a handset connected thereto by a short-range radio communication link, a problem arises when the communication quality of a radio channel to the handset has been deteriorated. When the quality of the short-range radio communication is reduced due to some reason, for example, a failure of the portable telephone device, the voice communication with the base station is also made difficult. In such a case, the base station is not expected to do channel disconnection processing or the like. It is necessary for the portable telephone device or the handset to handle such a problem.

The above conventional portable communication device equipped with the radio transmitter and the BlueTooth transmitter cannot handle such a problem of deteriorating the quality of short-range radio communication link because it looks at only the remaining amount of battery.

SUMMARY OF THE INVENTION

An object of the present invention is to provide a portable telephone device and an external adapter, which allow appropriate voice communication and link disconnection when the quality of a short-range wireless link has been deteriorated.

Another object of the present invention is to provide a communication control system and method, which can provide communication parties with appropriate voice communication and link disconnection even if the quality of a short-range wireless link has been deteriorated.

According to the present invention, a portable telephone device includes: a long-range wireless communication section for communicating with a base station of a mobile telephone system to communicate with a party on other end of line; a short-range wireless communication section for communicating with an external adapter; a monitor for monitoring quality of short-range communication with the external adapter; and a controller for activating the monitor during long-range communication.

Preferably, after the quality of short-range communication monitored becomes lower than a predetermined threshold level, the controller instructs the long-range wireless communication section to transmit a message indicative of short-range communication deterioration to the party on the other end of line. After the message has been sent to the party on the other end of line, the controller stores data received from the party on the other end of line onto a data memory.

When the quality of short-range communication monitored becomes lower than a predetermined threshold level, the controller may instruct the short-range wireless communication section to renew a short-range wireless communication link.

The external adapter may include: an adapter monitor for monitoring quality of short-range communication with the portable telephone device; and an adapter controller for activating the adapter monitor while the portable telephone device performing long-range communication with a base station of a mobile telephone system.

Preferably, when the quality of short-range communication monitored becomes lower than a predetermined threshold level, the adapter controller renews a short-range communication link to the portable telephone device. The external adapter further preferably renews a short-range communication link when the quality of short-range communication monitored has been lower than the predetermined threshold level for a predetermined time period.

According to another aspect of the present invention, a communication method includes the steps of: monitoring quality of short-range communication with the external adapter during long-range communication; when the quality of short-range communication monitored becomes lower than a predetermined threshold level, transmitting a voice guidance to the party on the other end of line; and when receiving data from the party on the other end of line in response to the voice guidance, recording the data onto a data memory.

When receiving a disconnect request from the external adapter, an existing short-range wireless communication link is disconnected and a connection request is transmitted to the external adapter to renew a short-range wireless communication link.

According to still another aspect of the present invention, a communication method includes the steps of: the external adapter monitoring quality of short-range communication with the portable telephone device while the portable telephone device performing long-range communication with a base station; when the quality of short-range communication monitored becomes lower than a predetermined threshold level, disconnecting an existing short-range wireless communication link depending on a user's instruction; transmitting a disconnect request to the portable telephone device; and the portable telephone device disconnecting the existing short-range wireless communication link; and transmitting a connection request to the external adapter to renew a short-range wireless communication link.

As described above, since the portable telephone device monitors the quality of short-range wireless communication while communicating with the party on the other end of line through the base station, the conversation is kept where possible and, even if the conversation is interrupted, then voice data is recorded.

Further, when a failure on the short-range communication link while both the portable telephone device and the external adapter normally operating, the external adapter and the portable telephone device try to communicate with each other where possible, for example, by replacing the impaired short-range communication link with a new one.

DESCRIPTION OF THE PREFERRED EMBODIMENTS

Figure 1:
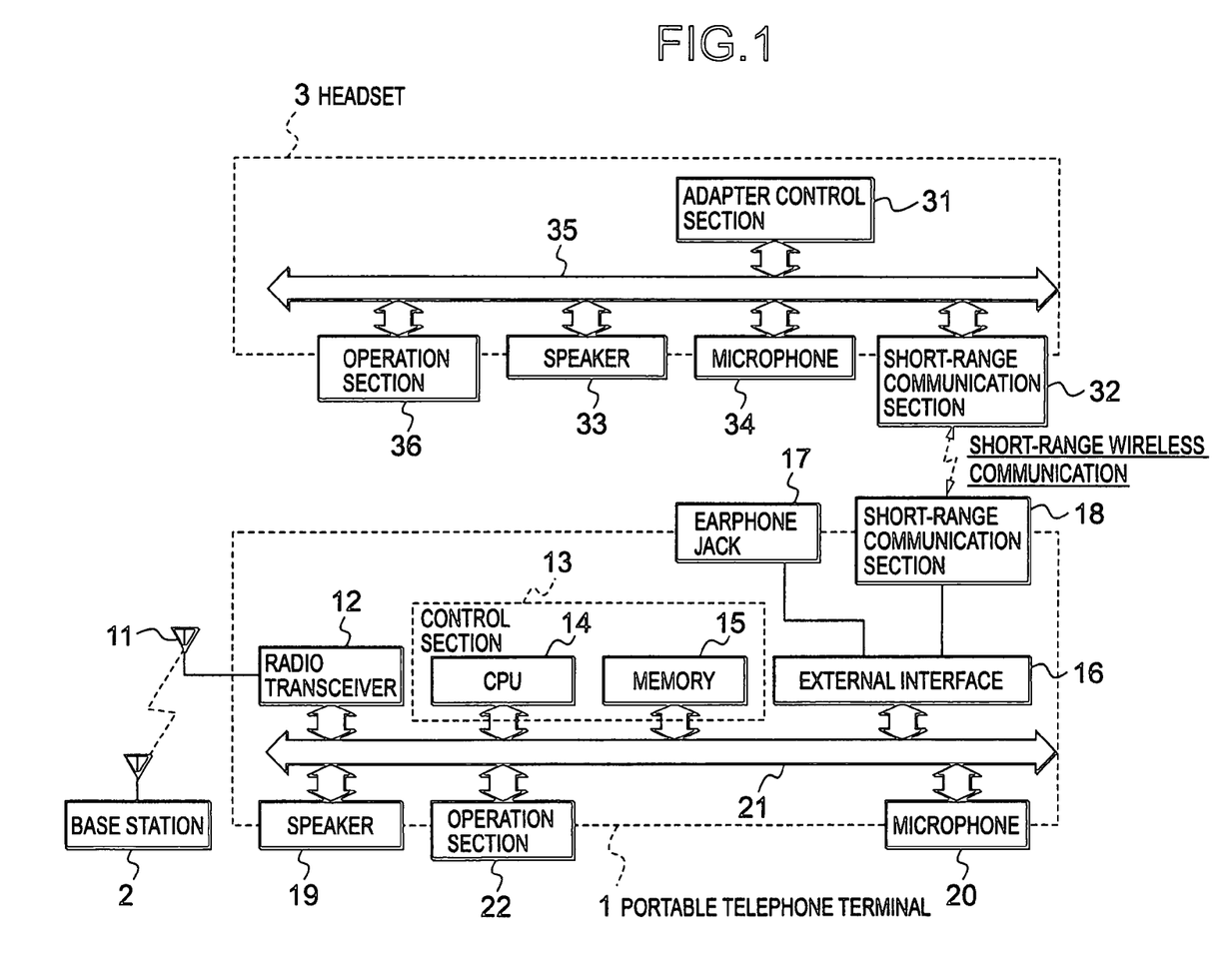
FIG. 1 is a block diagram showing a portable telephone terminal and a headset connected by a short-range wireless communication link according to a first embodiment of the present invention.

Referring to FIG. 1, a portable telephone terminal 1 is a mobile station connectable to a near base station 2 in an existing mobile communications system. In addition, the portable telephone terminal 1 is connectable to an external adapter (here, a headset 3) by a short-range wireless communication interface such as BlueTooth or Wireless LAN. In other words, the portable telephone terminal 1 can make long-range wireless communication with a base station 2 and short-range wireless communication with the headset 3. The headset 3 may be replaced with an external adapter such as a camera adapter or a camera module.

Portable Telephone Terminal

The portable telephone terminal 1 is provided with an antenna 11 and a radio transceiver 12, which are used to make the long-range communication. The radio transceiver 12, which is a long-range communication section, includes a modulator, a demodulator, a frequency converter and other necessary RF components. Under control of a control section 13, the radio transceiver 12 inputs a transmission baseband signal to produce a transmission RF signal and receives a RF signal through the antenna 11 to produce a reception baseband signal. The control section 13 includes a program-controlled processor 14 and a memory section 15.

The portable telephone terminal 1 is further provided with an external interface section 16 connected to an earphone jack 17 and a short-range communication section 18, a speaker (receiver) 19, a microphone (transmitter) 20, and an operation section 22 such as a keypad, which are connected by a control/data bus 21 and are controlled by the control section 13.

The control section 13 may include a plurality of program-controlled processors for different purposes, for example, of controlling the radio transceiver 12 and controlling various application programs. The program-controlled processor 14 may be a central processing unit (CPU) or a digital signal processor (DSP), which performs data processing using the memory 15 as work areas.

The memory section 15 may include dynamic and static memories and may be composed of one or more memory devices such as RAM and ROM. In this embodiment, the memory section 15 stores communication control programs and various messages such as voice guidance data for voice-recording and playback request, which will be described later.

The external interface section 16 performs logical and physical processing on communication with the headset 3 and/or other external devices having the same short-range communication interface. The processing of the external interface section 16 may belong to data-link and network layers in the classical 7-layer OSI model, but it is not restricted to these layer protocols.

The earphone jack 17 is a physical jack for connection to a wired earphone (not shown). The speaker 19 converts a received voice signal into sound waves under control of the control section 13. The microphone 20 receives user's voice to output transmission voice data to the control section 13. The operation section 22 may include a touch panel, pointer device and/or a keypad including a ten-key pad, which is used to input user's instructions.

The short-range communication section 18 may be typically a BlueTooth interface or Wireless LAN interface, which is used to communicate with the headset 3 or other external adapters located in a short-range area. The short-range communication section 18 may include encryption communication function for enhanced security.

External Adapter

The headset 3, as an example of the external adapter, is provided with an adapter control section 31, a short-range communication section 32, a speaker 33, a microphone 34, and an operation section 36, which are connected by a control/data bus 35 and are controlled by the adapter control section 31.

The adapter control section 31 has a limited number of functions, which is much smaller that of the control section 13 of the portable telephone terminal 1. Accordingly, a digital signal processor, which is suitable for relatively simple processing, is preferably employed as the adapter control section 31.

The short-range communication section 32 is a counterpart of the short-range communication section 18 of the portable telephone terminal 1. The short-range communication section 32 may include the same encryption communication function as that of the short-range communication section 18.

The speaker 33 and the microphone 34 are similar to those of the portable telephone terminal 1. The operation section 36 has a plurality of keys for a relatively small number of operations including volume control and recovery instruction of the short-range radio communication. Therefore, as compared to the operation section 22 of the portable telephone terminal 1, the operation section 36 has a smaller number of parts, that is, a simpler structure.

The short-range wireless communication between the portable telephone terminal 1 and the headset 3 employs both asynchronous link and synchronous link for real-time voice communication and data communication. As for the synchronous link, a designer can arbitrarily determine which one of circuit switching and packet switching is selected.

As described before, the headset 3 is an example of the external adapter. As another typical example, a camera adapter connected to a still or video camera module may be used as the external adapter to capture images and voices. Captured image and voice data are transmitted from the camera adapter to the portable telephone terminal 1 through the short-range radio communication interface and further they may be transmitted to the party on the other end of line through the base station 2.

Communication Control

Figure 2:
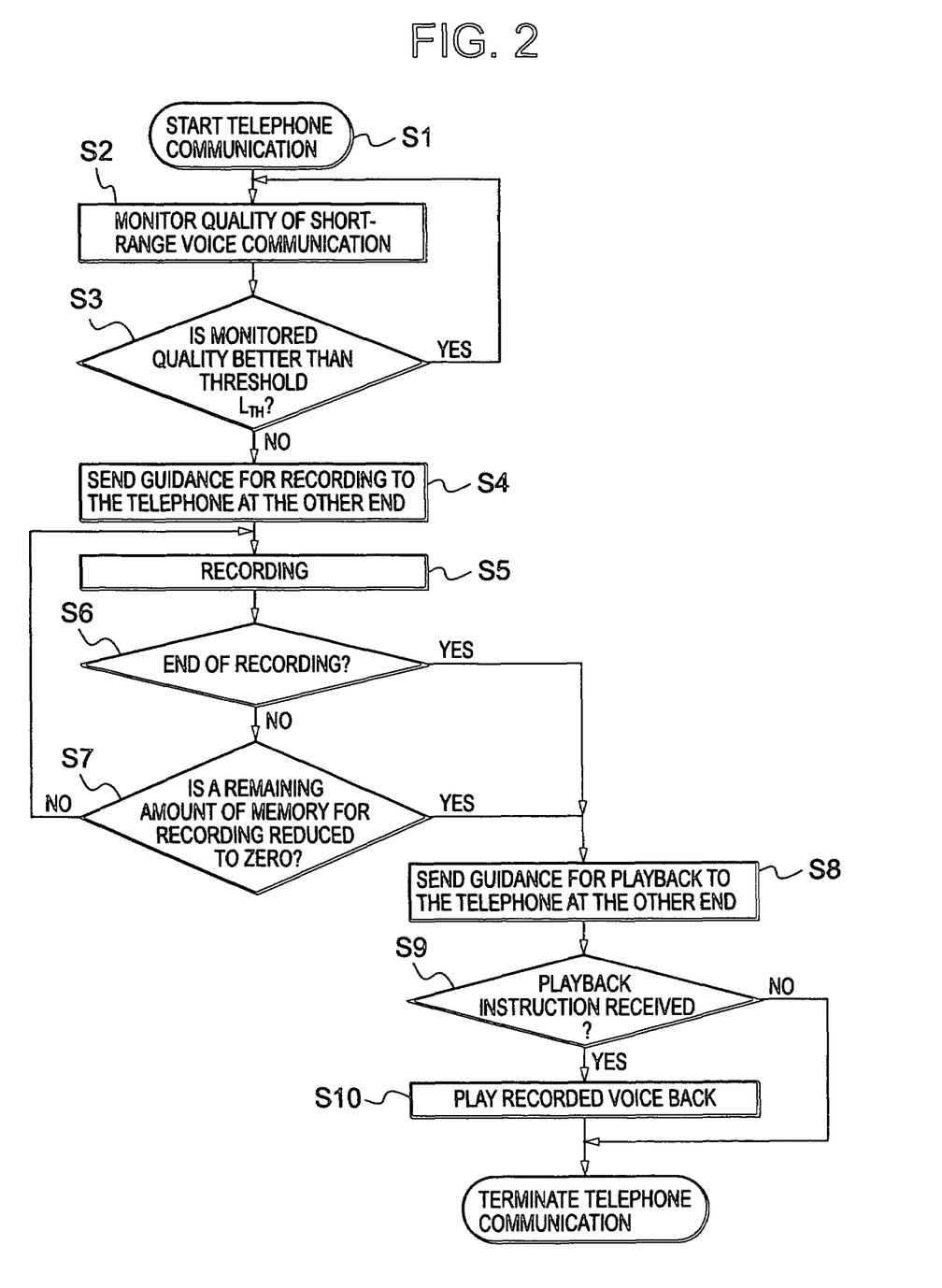
FIG. 2 is a flowchart showing a communication control operation when the quality of a short-range wireless link has been deteriorated according to a second embodiment of the present invention.

When the quality of the short-range communication has been deteriorated, the portable telephone terminal 1 and the headset 3 operate as shown in FIG. 2.

Referring to FIG. 2, when the long-range communication with the base station 2 starts to talk to the party on the other end of line, the short-range communication also starts (step S1). During the short-range communication, the control section 13 of the portable telephone terminal 1 monitors the quality of short-range voice communication (step S2). This monitoring operation may be repeatedly performed at regular intervals. The quality of the short-range voice communication can be monitored by measuring BER (Bit Error Rate) or SIR (Signal Interference Rate) of a received signal, or analyzing a pilot signal received from the headset 3.

The control section 13 determines whether the monitored quality of short-range communication is better than a predetermined threshold level $L_{TH}$ (step S3). When the monitored quality is greater than the predetermined threshold level $L_{TH}$ (YES in step S3), the control section 13 repeatedly performs the monitoring step S2.

When the monitored quality become lower than the predetermined threshold level $L_{TH}$ (NO in step S3), the control section 13 determines that the short-range communication quality has been deteriorated. When the short-range communication quality deterioration occurs, the control section 13 reads voice guidance data from the memory section 15 and instructs the radio transceiver 12 to transmit it to the party on the other end of line through the base station 2 (step S4). When the user on the other end of line listens to the voice guidance, this user can know what occurs at the other end of line. In the case of the voice guidance being a voice-recording prompt guidance, the user can send voice data or any kind of message back.

At the same time, the same guidance data may be sent to the headset 3 to output the same voice-recording guidance by the speaker 33 before the short-range voice communication link is completely impaired. This causes the user having the headset 3 held on his/her head to be notified that the voice-recording operation starts. Alternatively, the same guidance data may be sent to the headset 3 after the short-range communication has recovered from impairment.

When having received voice data from the party on the other end of line, the control section 13 records the received voice data onto the memory section 15 (step S5). The received voice data may be compressed and stored onto the memory section 15 using well-known voice compressing or coding technique. The control section 13 determines whether the recording is terminated (step S6) or whether a remaining amount of memory for recording is reduced to zero (step S7) while recording the received voice data.

In the case where a portable telephone terminal at the other end of line has a TV telephone function and uses a video camera module as the external adapter, not only voice data but also still/moving image data can be received from the party on the other end of line. In this case, video data is recorded in the memory section 15 at the step S5. A sufficient amount of memory is preferably prepared for storing video data.

When the recording has been terminated (YES in step S6) or when no memory is left for recording in the memory section 15 (YES instep S7), the control section 13 reads voice-playback guidance data from the memory section 15 and instructs the radio transceiver 12 to transmit it to the party on the other end of line through the base station 2 (step S8). When the user on the other end of line listens to the voice-playback guidance, the user can send a playback instruction message or voice message back by operating a keypad of a terminal of the user (not shown).

The control section 13 determines whether a playback instruction has been received from the party on the other end of line (step S9). When the playback instruction has been received (YES in step S9), the control section 13 reads the recorded voice data from the memory section 15 and instructs the radio transceiver 12 to transmit it to the party on the other end of line through the base station 2 (step S10). When the playback is terminated or when the playback is not selected (NO in step S9), the telephone communication is terminated.

The voice-recording guidance transmission step S4 is not necessarily performed immediately after the short-range communication quality deterioration occurs. Preferably, the control section 13 monitors the short-range communication quality for a predetermined time period after the short-range communication quality deterioration has been detected. If the quality deterioration has been detected more than a predetermined number of times during the predetermined time period, then the control section 13 starts voice-recording guidance transmission step S4.

The short-range voice communication link may be disconnected at any time after the playback guidance transmission step S8. From the viewpoint of processing load, the short-range voice communication link should be disconnected as soon as possible.

In addition, the control section 13 preferably notifies the user having the headset 3 held in place at his/her head that the portable telephone terminal 1 is in a state of recording voice data received from the party on the other end of line. In order to notify the user, the control section 13 may activate the speaker 19 to make a beep, display a message as such on display device (not shown), or blink an LED indicator (not shown).

As described above, when the quality of short-range voice communication becomes lower than a predetermined reference level, the portable telephone terminal 1 uses voice-recording guidance to prompt the party on the other end of line to record a voice message. When a voice message has been recorded, the user can listen to the voice message by operating the portable telephone terminal 1 or the headset 3 after the short-range voice communication link has been recovered. Accordingly, even if the conversation is interrupted, it is not necessary to call again.

When the quality of short-range voice communication becomes lower or its link has been impaired, a message notifying of link failure or the like is sent to the party on the other end of line. Accordingly, the party on the other end of line can know immediately what occurs at the other end of line and promptly record a desired message before on-hook.

Further, the portable telephone terminal 1 monitors the quality of short-range voice communication while communicating with the party on the other end of line through the base station 2. Accordingly, the conversation is kept where possible and, even if the conversation is interrupted, then voice data is recorded.

Link Recovery Control

During the above operation of the portable telephone terminal 1 as shown in FIG. 2, the headset 3 cannot communicate with the portable telephone terminal 1. Accordingly, similar to the control section 13 of the portable telephone terminal 1, the adapter control section 31 also monitors the quality of a short-range voice communication link in use. When the adapter control section 31 detects the short-range communication quality deterioration earlier than the portable telephone terminal 1, or before the short-range voice communication link is completely impaired, it is preferable to recover the short-range voice communication link to keep the conversation.

Figure 3:
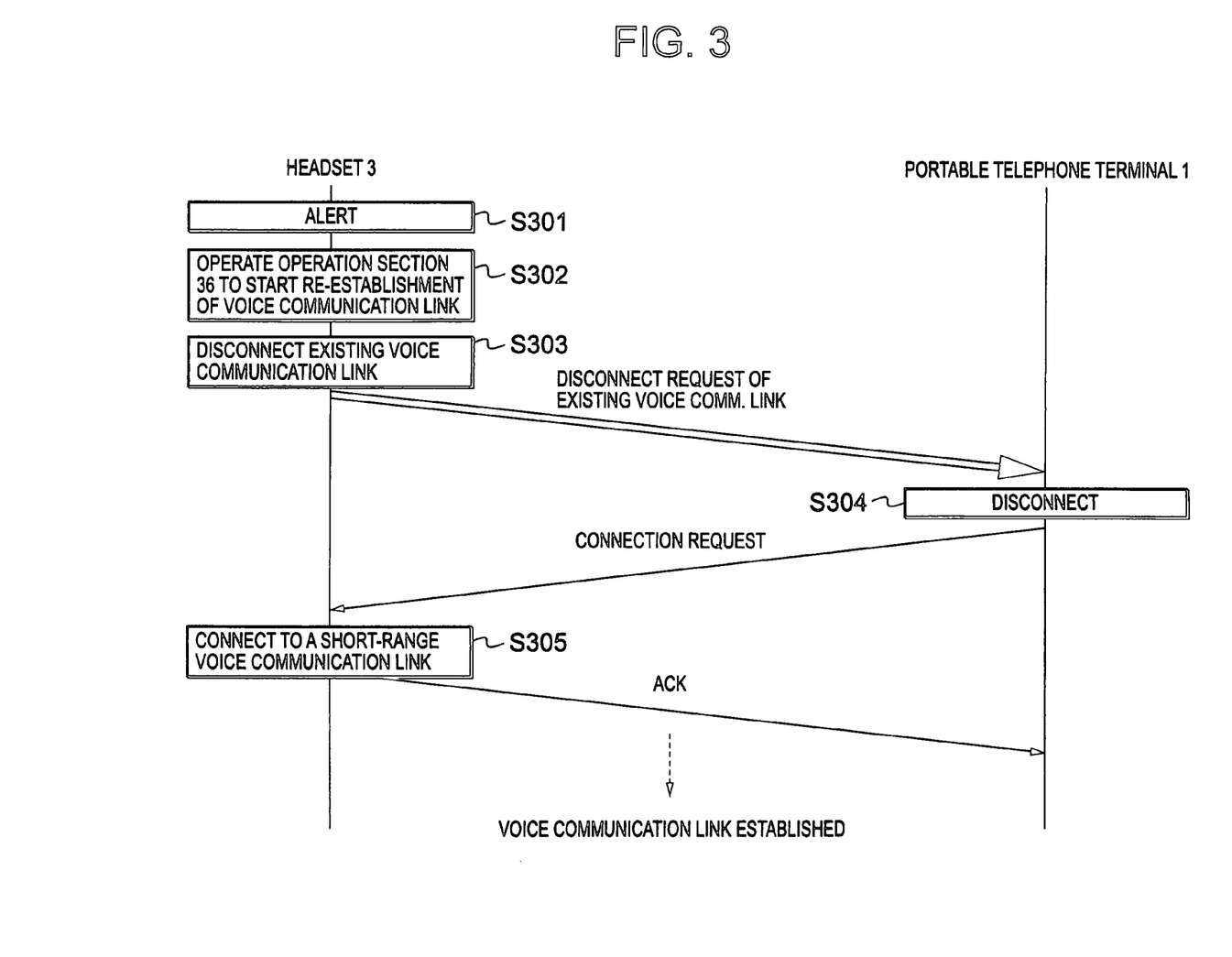
FIG. 3 is a diagram showing a sequence of re-establishment of a short-range wireless interconnection according to a third embodiment of the present invention.

Referring to FIG. 3, when the adapter control section 31 determines that the short-range communication quality becomes lower, the adapter control section 31 notifies the user by driving the speaker 33 to sound an alert or blinking an LED indicator that is not shown in the figure (step S301).

When the user is notified of the short-range communication quality deterioration, the user may operate the operation section 36 to start an operation of re-establishing a short-range voice communication link (step S302).

When the re-establishment operation starts, first, the adapter control section 31 instructs the short-range communication section 32 to force the existing voice communication link to be disconnected (step S303). After the existing voice communication link has been disconnected at the headset 3, the adapter control section 31 instructs the short-range communication section 32 to transmit a disconnect request for disconnecting the same voice communication link to the portable telephone terminal 1.

When having receiving the disconnect request from the headset 3, the control section 13 of the portable telephone terminal 1 instructs the short-range communication section 18 to perform a disconnecting operation of that voice communication link (step S304).

After the short-range voice communication link has been canceled at both ends, the control section 13 transmits a connection request with different parameters to the headset 3 so as to establish a voice communication connection between the portable telephone terminal 1 and the headset 3. The re-establishment of voice communication link is performed using a different frequency band or channel so as to improve the quality of voice communication.

When having received the connection request from the portable telephone terminal 1, the adapter control section 31 instructs the short-range communication section 32 to connect to a new short-range voice communication link (step S305) and, when the connection processing has been completed, transmits an acknowledge back to the portable telephone terminal 1. In this manner, a renewed short-range voice communication link is established.

In the present embodiment, the voice communication connection request is always made by the portable telephone terminal 1. The headset 3 or the external adapter cannot perform such a link request but responding to the link request and forced disconnection of a voice communication link in use. Since only such relatively simple functions are permitted, the headset 3 or the external adapter is functionally simplified, resulting in reduced power consumption and shortened development time.

Alternatively, it is possible for the headset 3 to perform a link request. In this case, the total number of processing steps can be reduced, increasing the speed of communication control and link recovery control.

In the present embodiment, at the step S302, the user operates the operation section 36 to start the re-establishment of a short-range voice communication link. The present invention is not restricted to such an operation. For example, the adapter control section 31 can automatically start the link re-establishment control. More specifically, when the adapter control section 31 detects the quality deterioration on the existing short-range voice communication link, the adapter control section 31 instructs the short-range communication section 32 to force the existing voice communication link to be disconnected (step S303). Thereafter, the above-described steps S304-S305 are performed.

The alert step S301 is not necessarily performed immediately after the short-range communication quality deterioration occurs. Preferably, the adapter control section 31 monitors the short-range communication quality for a predetermined time period after the short-range communication quality deterioration has been detected. If the quality deterioration has been detected more than a predetermined number of times during the predetermined time period, then the adapter control section 31 starts the alert step S4.

As described above, when a failure on the short-range communication link while both the portable telephone terminal 1 and the external adapter normally operating, the external adapter and the portable telephone terminal 1 try to communicate with each other where possible, for example, by replacing the impaired short-range communication link with a new one.

Figure 4:
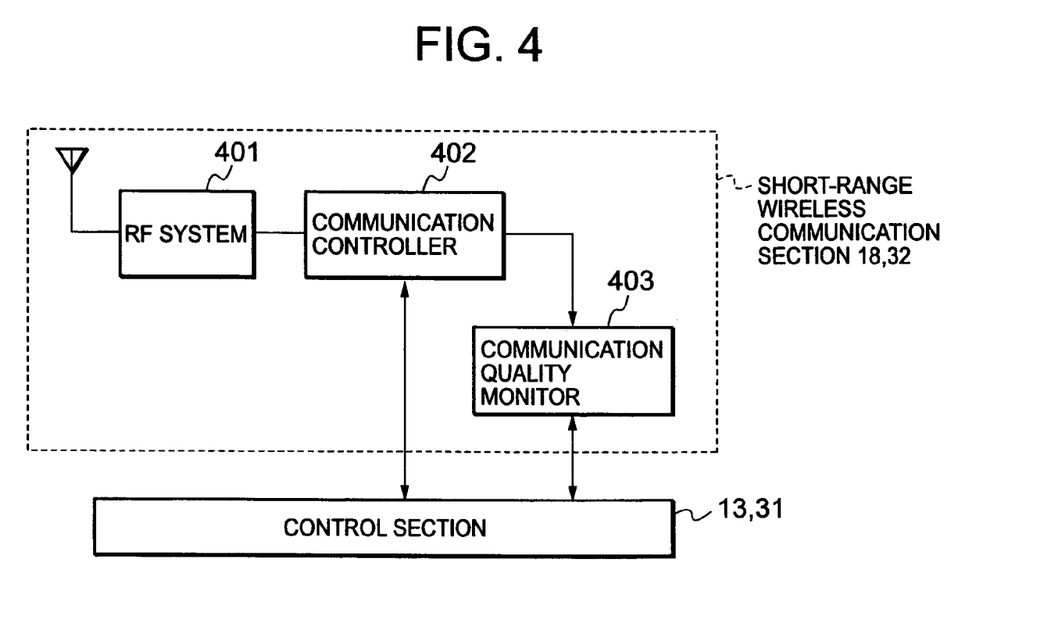
FIG. 4 is a block diagram showing a short-range wireless communication section in the portable telephone terminal and the headset as shown in FIG. 1.

Referring to FIG. 4, a short-range wireless communication section 18 or 32 as shown in FIG. 1 may include a RF system, a communication controller 402 and a communication quality monitor 403, which are controlled by the control section 13 or the adapter control section 31. The communication controller 402 may include a baseband controller and a ling manager.

The communication quality monitor 403 monitors the quality of short-range communication by measuring BER or SIR of a received signal or analyzing a pilot signal. The communication quality monitor 403 may be implemented in the control section 13 or the adapter control section 31.

The invention claimed is:

1. A portable telephone device comprising:
    a long-range wireless communication section for communicating with a base station of a mobile telephone system to communicate with a party on other end of line;
    a short-range wireless communication section for communicating with an external adapter;
    a monitor for monitoring quality of short-range communication with the external adapter; and
    a controller for activating the monitor during long-range communication, wherein, after the quality of short-range communication monitored becomes lower than a predetermined threshold level, the controller instructs the long-range wireless communication section to transmit a message indicative of short-range communication deterioration to the party on the other end of line.

2. The portable telephone device according to claim 1, wherein at least voice data is exchanged between the portable telephone device and the external adapter.

3. The portable telephone device according to claim 2, wherein the external adapter is a headset having a speaker and a microphone.

4. The portable telephone device according to claim 2, wherein the external adapter is a camera adapter connected to a camera module, wherein image and voice data are exchanged between the portable telephone device and the camera adapter.

5. A portable telephone device comprising:
   a long-range wireless communication section for communicating with a base station of a mobile telephone system to communicate with a party on other end of line;
   a short-range wireless communication section for communicating with an external adapter;
   a monitor for monitoring quality of short-range communication with the external adapter; and
   a controller for activating the monitor during long-range communication, further comprising:
   a data memory for storing data that is received from the party on the other end of line,
   wherein, after the message has been sent to the party on the other end of line, the controller stores data received from the party on the other end of line onto the data memory.

6. A portable telephone device comprising:
   a long-range wireless communication section for communicating with a base station of a mobile telephone system to communicate with a party on other end of line;
   a short-range wireless communication section for communicating with an external adapter;
   a monitor for monitoring quality of short-range communication with the external adapter; and
   a controller for activating the monitor during long-range communication, wherein the message is transmitted to the party on the other end of line when the quality of short-range communication monitored has been lower than the predetermined threshold level for a predetermined time period.

7. A portable telephone device comprising:
   a long-range wireless communication section for communicating with a base station of a mobile telephone system to communicate with a party on other end of line;
   a short-range wireless communication section for communicating with an external adapter;
   a monitor for monitoring quality of short-range communication with the external adapter; and
   a controller for activating the monitor during long-range communication, wherein, after the quality of short-range communication monitored becomes lower than a predetermined threshold level, the controller instructs the long-range wireless communication section to transmit a message indicative of short-range communication deterioration to the party on the other end of line, and
   wherein, when the quality of short-range communication monitored becomes lower than a predetermined threshold level, the controller instructs the short-range wireless communication section to renew a short-range wireless communication link.

8. A portable telephone device comprising:
   a long-range wireless communication section for communicating with a base station of a mobile telephone system to communicate with a party on other end of line;
   a short-range wireless communication section for communicating with an external adapter;
   a monitor for monitoring quality of short-range communication with the external adapter; and
   a controller for activating the monitor during long-range communication, wherein, after the quality of short-range communication monitored becomes lower than a predetermined threshold level, the controller instructs the long-range wireless communication section to transmit a message indicative of short-range communication deterioration to the party on the other end of line, and
   wherein the controller instructs the short-range wireless communication section to transmit the message indicative of short-range communication deterioration to the external adapter.

9. A communication method for a portable telephone device comprising:
   a long-range wireless communication section for communicating with a base station of a mobile telephone system to communicate with a party on other end of line; and
   a short-range wireless communication section for communicating with an external adapter,
   the method comprising:
   monitoring quality of short-range communication with the external adapter during long-range communication;
   when the quality of short-range communication monitored becomes lower than a predetermined threshold level, transmitting a voice guidance to the party on the other end of line; and
   when receiving data from the party on the other end of line in response to the voice guidance, recording the data onto a data memory.

10. The communication method according to claim 9, further comprising:
    transmitting a playback guidance to the party on the other end of line; and
    when receiving a playback request in response to the playback guidance from the party on the other end of line, transmitting the data recorded to the party on the other end of line.

11. The communication method according to claim 9, further comprising:
    when receiving a disconnect request from the external adapter, disconnecting an existing short-range wireless communication link; and
    transmitting a connection request to the external adapter to renew a short-range wireless communication link.

12. The communication method according to claim 9, further comprising:
    when the quality of short-range communication monitored becomes lower than the predetermined threshold level, transmitting a voice guidance to the external adapter.

* * * * *